Aug. 6, 1929.  C. C. FARMER  1,723,143
CHOKE CLEANING DEVICE

Filed April 23, 1927

INVENTOR
CLYDE C. FARMER
BY Wm. M. Cady
ATTORNEY

Patented Aug. 6, 1929.

1,723,143

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

CHOKE-CLEANING DEVICE.

Application filed April 23, 1927. Serial No. 185,980.

This invention relates to feed or reducing valve devices of the type adapted more particularly for supplying fluid under pressure to the brake pipe of a fluid pressure brake system.

In the usual feed valve device of the type having a piston adapted to operate a slide valve for controlling the supply of fluid under pressure to the brake pipe, means are employed to permit the flow of fluid under pressure at a restricted rate from the valve chamber to the piston chamber. Said means may comprise a passage connecting the opposite sides of the piston, and containing a choke plug to restrict the flow of fluid.

The fluid under pressure supplied from a main reservoir to a feed valve device usually contains some oil in a vapor or condensed form and perhaps other foreign material and with the feed valve construction described above, the choke plug in the passage connecting the opposite sides of the piston, quite often becomes restricted or closed, which results in sluggish operation of the device and in some cases may cause a failure to operate.

The principal object of my invention is to provide an improved construction of feed valve device, having means for cleaning the opening in a choke plug, through which fluid under pressure flows from the valve chamber to the piston chamber.

Figure 1:
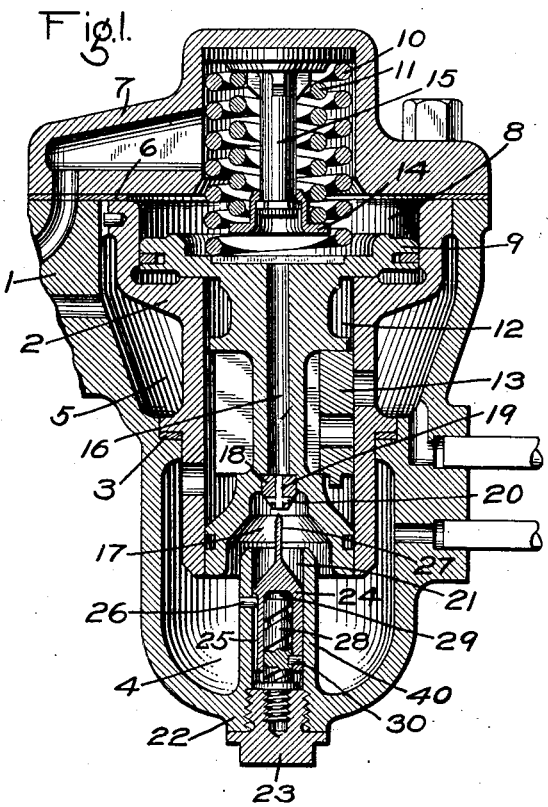
Figure 2:
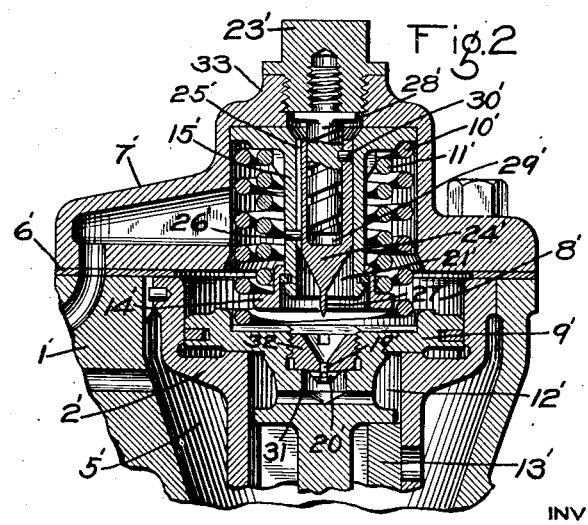

In the accompanying drawing; Fig. 1 is a sectional view of a portion of a feed valve device showing my invention applied thereto; and Fig. 2 is a sectional view of a portion of a feed valve device, showing another form of my invention applied thereto.

In Fig. 1 of the drawing, the supply portion of a feed valve device is shown comprising a casing 1, having a chamber containing a removable bushing 2, said bushing having a flange adapted to seal on a gasket 3 and form the chambers 4 and 5. The upper end of the bushing seals on a gasket 6 clamped between the casing 1 and a cover plate 7, thereby forming the chamber 8.

Chamber 8 contains the usual piston 9, adapted to be opposed in the initial outward movement by a spring 10 and after a predetermined outward travel the piston is adapted to engage a second spring 11, normally held under compression between the cover plate 7 and a retainer ring 14 secured to a depending stem 15. Chamber 12, formed in the removable bushing 2, contains the usual slide valve 13, adapted to be operated by the piston 9.

The stem of piston 9 is provided with a passage 16, adapted to connect the piston chamber 8 to the chamber 4 by way of a cavity 17 formed in the piston guide portion. Mounted in the end of the passage 16, adjacent cavity 17, is a choke plug 18 of an improved construction, having a tapered end pointing toward the fluid supply and having a central port 19 and a plurality of radial cross ports 20, in the tapered end of the plug, said cross port opening into the port 19 and having the same flow area as the central port 19.

According to my invention, I provide a hollow stem 40, preferably formed integral with the casing 1 and extending upwardly into the chamber 4. The stem 40 has a central opening 21, preferably cylindrical in shape and extending through the wall of the casing and through a boss 22, formed on the outside of the casing. The lower portion of the opening 21 is threaded for a cap nut 23.

Slidably mounted in the central opening 21 of the stem 40 is a plunger 24, having a longitudinal groove 25 into which projects a guide pin 26, which pin is secured in the wall of the stem 40. The plunger 24 has a needle like extension 27 with a tapered point, which extension is in line with and of a slightly less diameter than the central opening 19 through the choke plug 18 in the piston guide portion.

Mounted on the cap nut 23 is a screw-threaded stem 28, adapted to extend into a central opening 29 formed in the plunger 24. A guide pin 30 secured in the wall of the plunger extends inwardly and engages in a screw-thread on the stem 28.

The pitch of the screw-thread on the stem 28 is greater than the pitch of the screw-thread on the cap nut 23 and the threads on both the cap nut and stem are formed in the same rotative direction.

In operation, if the central opening 19 through the choke plug 18 becomes restricted or closed with foreign material, the cap nut 23 is partially unscrewed so as to cause a retractive movement of the nut with respect to the casing. The stem 28 turns with the cap nut 23 and on account of the greater pitch of the screw-threads on the stem 28, said screw-threads exert an inward thrust on the guide pin 30 in the plunger 24. Since the plunger 24 is held against rotation by the guide pin 26, the inward thrust on the guide pin 30 moves the plunger 24 inwardly, with the result, that with a relatively small outward movement of the cap nut 23, the plunger 24 is forced inwardly until the extension 27 enters and passes through the central opening 19 of the choke plug 18, thereby clearing the opening 19 of all foreign material that may have become lodged therein.

After cleaning the central opening 19 of the choke plug as described above, the direction of rotation of the cap nut 23 is reversed and the plunger 24 is pulled back to the normal position, as shown on the drawing.

In the construction shown in Fig. 2, the valve chamber 12' is connected to the piston chamber 8' through a transverse passage 31 in the piston stem and a choke plug 32 secured in a cavity in the piston face by screw-threaded engagement. The choke plug 32 may be of the same construction as the choke plug 18 shown in Fig. 1, in that choke plug 32 has a tapered end pointing in the direction of fluid supply and has a central port 19' and cross ports 20'.

In order to adapt my invention to the feed valve construction shown in Fig. 2, the spring retainer stem 15' is provided with a central opening 21', said opening being adapted to receive the plunger 24', and a guide pin 26' engaging in a groove 25' of the plunger 24'. A boss 33 is formed on the cover plate 7 to receive the cap nut 23', having the screw-threaded extension 28' mounted thereon.

In operation, the plunger needle extension 27' is projected through the central port 19' in the choke plug 32, by turning the cap nut 23' in the direction to remove same from the casing 1', in the same manner as hereinbefore described in connection with the construction shown in Fig. 1.

Having now described my invention, what I claim as new and desire to secure by Letters Patent, is:—

1. A valve device comprising a casing, a movable abutment in said casing having a restricted port, a longitudinally movable non-rotatable plunger having an extension out of engagement with said port in the normal operation of said valve device and adapted to be projected into said port, a rotatable member having screw-threaded engagement in said casing, a threaded stem carried by said member, a pin engaging the thread in said stem and secured to said plunger, whereby the rotation of said member operates to effect the projection of said plunger.

2. A valve device comprising a casing, a movable abutment in said casing having a restricted port, a plunger, and a member associated with said casing and operable upon a retracted movement for projecting said plunger into said port.

In testimony whereof I have hereunto set my hand.

CYLDE C. FARMER.